United States Patent [19]
Abbaticchio et al.

[11] Patent Number: 4,754,275
[45] Date of Patent: Jun. 28, 1988

[54] DISPLAY WITH SUPPLEMENTAL LIGHTING SYSTEM

[75] Inventors: Mark J. Abbaticchio, Plantation; Fernando Gomez, West Palm Beach, both of Fla.

[73] Assignee: Motorola, Inc., Schaumburg, Ill.

[21] Appl. No.: 132,628

[22] Filed: Dec. 9, 1987

Related U.S. Application Data

[63] Continuation of Ser. No. 742,360, Jun. 7, 1985, abandoned.

[51] Int. Cl.⁴ .......................... G09G 3/18; H04B 5/04
[52] U.S. Cl. .............. 340/825.44; 340/311.1; 340/765
[58] Field of Search ................... 340/825.44, 756, 763, 340/765, 311.1; 455/154, 159

[56] References Cited

U.S. PATENT DOCUMENTS

| | | |
|---|---|---|
| 3,130,349 | 4/1964 | Mallory . |
| 3,421,005 | 1/1969 | Baker . |
| 3,849,979 | 11/1974 | Tanji .................................. 340/793 |
| 3,893,081 | 7/1975 | Hopkins ..................... 340/815.17 X |
| 3,904,924 | 9/1975 | Hilsum et al. ....................... 340/719 |
| 3,962,600 | 6/1976 | Pittman .............................. 315/158 |
| 4,254,408 | 3/1981 | Kerschner, III .......... 340/815.17 X |
| 4,257,041 | 3/1981 | Masucci .......................... 340/718 X |
| 4,315,258 | 2/1982 | McKnight et al. ................. 340/784 |
| 4,319,237 | 3/1982 | Matsuo et al. ..................... 340/713 |
| 4,376,934 | 3/1983 | Prohaska et al. ............. 340/815.17 |
| 4,549,819 | 10/1985 | Muramoto et al. ................ 374/163 |
| 4,644,350 | 2/1987 | Ishii .............................. 340/825.44 |
| 4,713,659 | 12/1987 | Oyazi et al. ................... 340/825.44 |

Primary Examiner—Gerald L. Brigance
Attorney, Agent, or Firm—Martin J. McKinley

[57] ABSTRACT

A display device has a single switch that transfers a stored message to a liquid crystal display and simultaneously activates a supplemental display lighting system. The supplemental lighting system is inhibited, however, when circuitry senses that ambient light conditions are sufficient to illuminate the display.

3 Claims, 1 Drawing Sheet

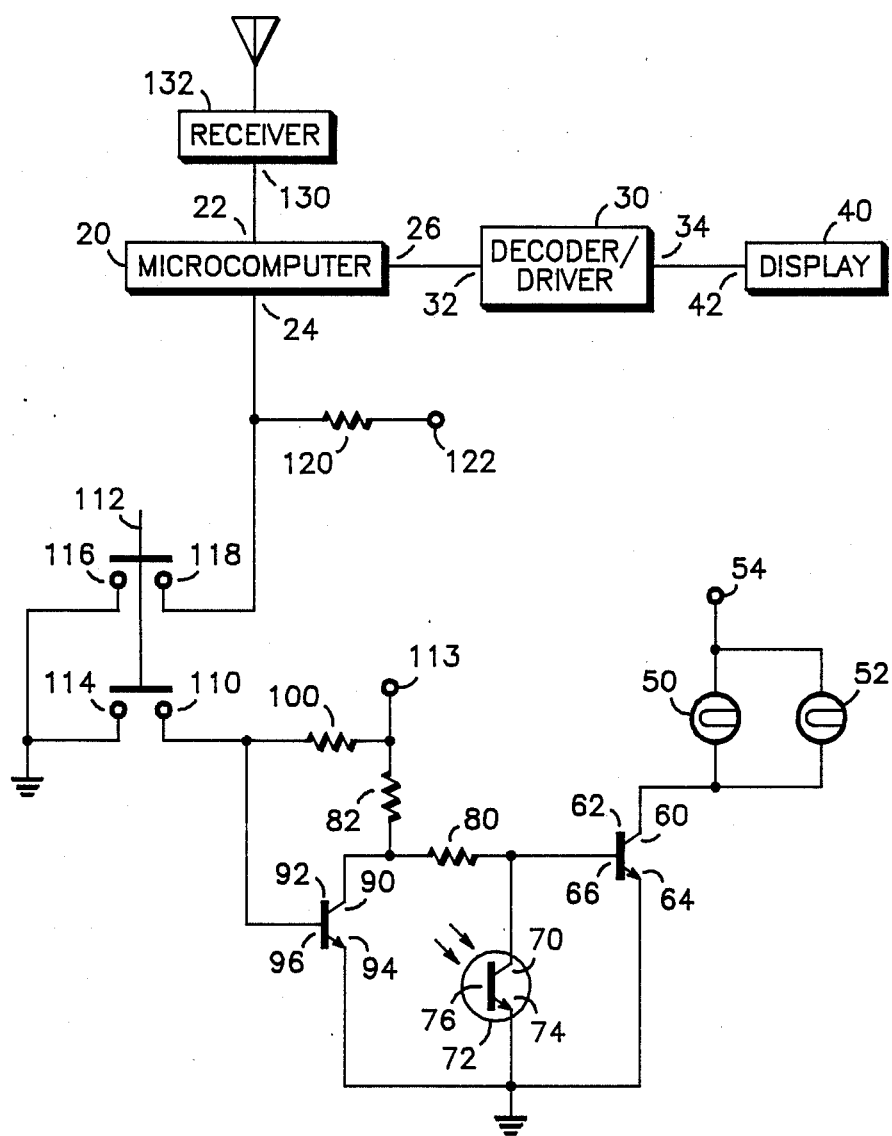

DISPLAY WITH SUPPLEMENTAL LIGHTING SYSTEM

This is a continuation of application Ser. No. 742,360, filed June 7, 1985 and now abandoned.

BACKGROUND of the INVENTION

This invention relates to the field of display systems and more particularly to passive display systems that have internal supplemental lighting.

In the design of portable electronics equipment, such as selective call personal paging receivers, portable two way radios, pocket calculators, and watches, there has been a trend to make such devices smaller in size and to crowd more features into a given package size. The result is that there is less space on the package to position controls such as switches. To compensate for the lack of control space, some functions that were previously handled by separate controls may often be combined.

In a device that utilizes a passive display with internal supplemental lighting, the functions of transferring the message to the display and activating the internal supplemental lighting source can be combined and controlled by a common "read" switch. Combining these two functions, however, results in increased battery drain, a problem that may already be complicated by the fact that a reduction in the package size necessitates a reduction in battery size and capacity. This increase in battery drain may often not be necessary, however, because ambient light conditions may be sufficiently strong such that internal supplemental lighting is not required. This problem can be overcome by providing the device with a means to sense the ambient light intensity and if it is below a threshold level, then, and only then, can the internal supplemental light source be activated by the read switch.

SUMMARY OF THE INVENTION

Accordingly, it is an object of the invention to provide an improved display system.

It is another object of the invention to provide a display system that conserves packaging space by permitting a single switch to control two functions.

It is another object of the invention to provide a display system that reduces power consumption by inhibiting the activation of an internal supplemental light source when the ambient light intensity is sufficient to illuminate the display.

It is another object of the invention to provide a display system that permits a single switch to transfer a message or image into the display and to activate an internal supplemental light source provided the ambient light intensity is below a threshold level.

Briefly, the invention comprises a display apparatus which includes a display and a means for storing a message. A means for inputting the message to the display is connected between the storing means and the display. The display apparatus also has a visible light source adjacent to the display for illuminating the display. Means are provided for sensing the ambient light intensity. A driver circuit is coupled to and powers the light source. The driver circuitry has a predetermined threshold level and it is connected to and responsive to the sensing means.

Connected to the input means and the driver circuitry is a means for actuating the input means and the driver circuitry. When the actuating means is activated the input means transfers the message to the display and, at substantially the same time, it causes the driver circuitry to power the light source if the intensity of ambient light is below the threshold level.

In an alternate embodiment the invention comprises a display apparatus which includes a display and a means for storing a messsage. A display decoder/driver circuit is connected between an output port of a microcomputer and the display. At least one lamp is located adjacent to the display. A first output terminal of a double pole switch is connected to an input port of the microcomputer. The collector of a first transistor is connected to the lamp, and the collector of a second transistor is connected to the base of the first transistor. The base of the second transistor is connected to a second output terminal of the double pole switch. A phototransistor, which responds to ambient light intensity, is connected to the base of the first transistor. When the switch is activated, it causes the microprocerssor to transfer a message to the display, and at substantially the same time, causes the lamp to illuminate the display with light if the intensity of ambient light is below a threshold level.

BRIEF DESCRIPTION OF THE DRAWING

FIG. 1 is a schematic diagram of the preferred embodiment of the invention. One application of the invention, its use in a selective call paging receiver, is also illustrated.

DETAILED DESCRIPTION OF THE PREFERRED EMBODIMENT

Referring to FIG. 1, a microcomputer 20 has two input ports 22 and 24, and an output port 26. In the preferred embodiment, microcomputer 20 is a Motorola MC1468HC05C4 microcomputer, although any microcomputer well known in the art would be suitable. A message is stored in microcomputer 20 through input port 22. When input port 24 goes low, software within microcomputer 20 transfers the stored message to output port 26, which is connected to a decoder/driver circuit 30 through an input port 32. The software also formats the message such that it is usable by decoder/driver circuit 30. Software to perform these functions will depend on the particular microcomputer and decoder/driver circuitry utilized, however, it is generally uncomplicated and within the ability of anyone skilled in the art.

In the preferred embodiment, decoder/driver circuit 30 is a Motorola MC145000 integrated circuit, although any liquid crystal display decoder/driver circuit of the type well known in the art would be suitable. The Motorola MC145000 is limited in the number of characters it can drive, however, the MC145001 can be added to the MC145000 to expand the number of characters. Microcomputer output 26, and consequently decoder/driver input 32, actually consist of two lines (not shown), a data line and a clock line. The output 34 of decoder/driver circuit 30 is a multiline output which is connected to a display 40 through an input port 42. The number of lines necessary to interconnect decoder/driver circuit 30 to display 40 will depend on the particular display selected and the number of characters displayed. Display 40 may be a liquid crystal display of the type well known in the art.

Light sources 50 and 52 are preferably incandescent lamps of the type well known in the art as "grain of wheat" lamps. Light sources 50 and 52 are connected in parallel, with one lead connected at node 54 to the positive terminal of a battery (not-shown) and the other lead connected to collector 60 of a transistor 62. Transistor 62 is an NPN bipolar transistor, of the type well known in the art. In the preferred embodiment transistor 62 has a beta of approximately 80, although, in this application the beta of the transistor is not particularly critical. The emitter 64 of transistor 62 is connected to ground, while the base 66 is connected to the junction of collector 70 of a phototransistor 72 and to one lead of a resistor 80. Any number of phototransistors well known in the art are satisfactory. The emitter 74 of phototransistor 72 is connected to ground. The base 76 of phototransistor 72, by proper-physical placement, is exposed to the ambient light, but not to light emitted from lamps 50 and 52.

The other lead of resistor 80 is connected to the junction of a resistor 82 and the collector 90 of a transistor 92. Transistor 92 is an NPN bipolar transistor similar in characteristics to transistor 62. The emitter 94 of transistor 92 is connected to ground while the base 96 is connected to the junction of a resistor 100 and terminal 110 of a dual pole single throw momemtary contact push switch 112. The other leads of resistors 82 and 100 are joined at a node 113 and then connected to the positive terminal of the battery (not shown). Terminals 114 and 116 of switch 112 are connected to ground, while the remaining terminal 118 is connected to a resistor 120 and input port 24 of microcomputer 20. The other lead of resistor 120 is connected at a node 122 to a source of positive voltage (not shown), preferably 3.7 volts, that powers microcomputer 20.

One application of the invention is illustrated by broken lines in FIG. 1 wherein the output 130 of a selective call personal paging receiver 132 is connected to input port 22 of microcomputer 20. In this application, messages to be displayed are received by receiver 132 and are stored in microcomputer 20. As will be described later, when switch 112 is activated, the message is moved from the storage location in microcomputer 20 to display 40. Other applications of the invention are also possible, for example, messages originating from a calculator keyboard (not shown) may also be entered through microcomputer input port 22.

Operationally, when the device operator wishes to display a message, he or she activates switch 112 whereupon terminal 118 becomes grounded through terminal 116. This pulls microcomputer input port 24 low. Software in microcomputer 20 senses that input port 24 is low and transfers the stored message to output port 26, and if necessary, changes the format of the message such that it is compatible with decoder/driver 30. Decoder/driver 30 accepts this message at its input port 32 and reformats the message such that it is compatible with display 40. The properly formatted message enters display 40 at input port 42 whereupon its image appears in the display.

When switch 112 is not activated, resistor 100 sources current into base 96 of transistor 92, thereby saturating transistor 92 and pulling collector 90 substantially to ground. With collector 90 near ground, no current is sourced into base 66 of transistor 62, thereby leaving transistor 62 in the off state with its collector 60 floating. Because collector 60 is floating, no current can flow from point 54 through lamps 50 and 52, consequently, lamps 50 and 52 are off.

When the user activates switch 112, terminal 110 of switch 112 is pulled to ground through terminal 114, thereby pulling base 96 of transistor 92 to ground and stopping the flow of current into base 96. With no base current, transistor 92 is switched off and its collector 90 is pulled high through resistor 82. If there is insufficient light impinging upon base 76 of phototransistor 72, the phototransistor is in the off state. When phototransistor 72 is off, current originating from point 113 flows through resistors 82 and 80 and into base 66 of transistor 62, thereby saturating transistor 62. With transistor 62 staurated, its collector 60 is pulled substantially to ground and lamps 50 and 52 are illuminated. Because of the close proximity of lamps 50 and 52 to the display 40, the display is illuminated with visible light, thereby improving its visibility when ambient light conditions are insufficient to activate phototransistor 72.

As the intensity of ambient light increases, a threshold level is reached whereby phototransistor 72 becomes conductive and current being sourced from resistors 82 and 80 is shunted to ground through the collector-emitter path of the phototransistor, thereby cutting off the base current to transistor 62. With no base current, transistor 62 is in the off state and unable to sink current from lamps 50 and 52, therefore, lamps 50 and 52 remain off.

Thus, when ambient light conditions are below the threshold level required to turn on phototransistor 72, activating switch 112 causes the message stored in microcomputer 20 to be transferred to display 40, and at substantially the same time, causes lamps 50 and 52 to illuminate the display. Conversely, when ambient light conditions are sufficiently intense to exceed the threshold level required to turn on phototransistor 72, activating switch 112 again causes the stored message to be transfered to display 40, however, lamps 50 and 52 are not turned on.

Thus, it can be seen that when switch 112 is activated, the message is transfered to display, but the display is illuminated, if and only if, the ambient light intensity is insufficient to properly illuminate the display. This combination of the functions of transferring the message to the display and illuminating the display conserves packaging space by eliminating the need for two separate switches to individually control these functions. Power consumption, which is extremely important in battery operated equipment, is conserved-by permitting lamps 50 and 52 to be powered only when ambient light conditions are insufficient to illuminate the display.

We claim:

1. A selective call radio paging receiver, comprising in combination:
   means for receiving a paging signal that includes a message;
   means for storing a received message;
   means for displaying a stored message;
   a light source for illuminating said displaying means;
   a switch electrically coupled to said storing means and having first and second positions;
   means for sensing ambient light intensity; and
   driver circuitry electrically coupled to said switch, to said ambient light sensing means, and to said light source;
   said radio paging receiver being constructed and arranged such that when said switch is moved from said first to said second position, a stored message is transferred from said storing means to said displaying means and said light source is activated if the intensity of ambient light, as sensed by said ambient light sensing means, is below a predetermined threshold level.

2. The display apparatus of claim 1, wherein said driver circuitry includes a first transistor, the collector of said first transistor being coupled to said light source; and said ambient light sensing means includes a phototransistor coupled to the base of said first transistor.

3. The display apparatus of claim 2, wherein said driver circuitry further includes a second transistor, the base of said second transistor being coupled to said switch and the collector of said second transistor being coupled to said base of said first transistor.

* * * * *